US010616453B2

(12) United States Patent
Vilermo et al.

(10) Patent No.: US 10,616,453 B2
(45) Date of Patent: Apr. 7, 2020

(54) AUDIO AND VISUAL SYSTEM INCLUDING A MASK FUNCTIONING FOR A CAMERA MODULE AND AN AUDIO TRANSDUCER MODULE

(71) Applicant: Nokia Technologies Oy, Espoo (FI)

(72) Inventors: Miikka Tapani Vilermo, Siuro (FI);
Antero Tossavainen, Tampere (FI);
Jyrki Sakari Kimmel, Tampere (FI)

(73) Assignee: Nokia Technologies Oy, Espoo (FI)

( * ) Notice: Subject to any disclaimer, the term of this patent is extended or adjusted under 35 U.S.C. 154(b) by 101 days.

(21) Appl. No.: 15/403,863

(22) Filed: Jan. 11, 2017

(65) Prior Publication Data
US 2018/0198959 A1 Jul. 12, 2018

(51) Int. Cl.
*H04N 5/225* (2006.01)
*H04R 1/02* (2006.01)
*H04R 1/46* (2006.01)
*H04R 17/02* (2006.01)

(52) U.S. Cl.
CPC ....... *H04N 5/2252* (2013.01); *H04N 5/22521* (2018.08); *H04R 1/028* (2013.01); *H04R 1/46* (2013.01); *H04R 17/02* (2013.01); *H04R 2499/11* (2013.01)

(58) Field of Classification Search
None
See application file for complete search history.

(56) References Cited

U.S. PATENT DOCUMENTS

| 6,980,828 | B2 | 12/2005 | Nousiainen |
| 8,199,244 | B2* | 6/2012 | Baraniuk ............. H04L 25/20 348/335 |
| 8,879,771 | B2 | 11/2014 | Mellow et al. |
| 9,167,325 | B2 | 10/2015 | Yang et al. |
| 9,313,599 | B2 | 4/2016 | Tammi et al. |
| 9,445,193 | B2* | 9/2016 | Tico .................... G10L 21/0208 |

(Continued)

FOREIGN PATENT DOCUMENTS

WO   WO 2010/014074 A1   2/2010

OTHER PUBLICATIONS

Barbara Haubmann & Karin Pirolt; The story of an American-Finnish-Austrian co-creation; Aug. 2019, Next-Incubator Blog, Kai Saksela-Noiseless Acoustics; pp. 1-5 (Year: 2019).*

(Continued)

*Primary Examiner* — Cynthia Segura
(74) *Attorney, Agent, or Firm* — Alston & Bird LLP (57) ABSTRACT

An audio and visual system and a wearable device that incorporates an audio and visual system are provided. The audio and visual system may include a camera sensor and a mask overlying the camera sensor and spaced therefrom so as to at least in part define a first cavity between the camera sensor and the mask. The mask includes a plurality of areas including a plurality of opaque areas and a plurality of areas that are acoustically transparent. The audio and visual system also includes an audio transducer in acoustic communication with the first cavity and configured to generate or receive acoustic signals via the mask. The wearable device includes the audio and visual system as well as a housing in which the audio and visual system is at least partially disposed.

25 Claims, 4 Drawing Sheets

(56) References Cited

U.S. PATENT DOCUMENTS

| | | | |
|---|---|---|---|
| 2005/0036041 A1* | 2/2005 | Gallagher | H04N 3/155 348/222.1 |
| 2005/0084137 A1* | 4/2005 | Kim | G06K 9/00268 382/115 |
| 2005/0128322 A1 | 6/2005 | Eaton et al. | |
| 2005/0189622 A1 | 9/2005 | Humpston et al. | |
| 2005/0212929 A1* | 9/2005 | Schell | H01L 27/14618 348/230.1 |
| 2006/0237806 A1* | 10/2006 | Martin | B81C 1/00182 257/415 |
| 2010/0110283 A1 | 5/2010 | Shin | |
| 2010/0277805 A1* | 11/2010 | Schilling | G02B 3/0043 359/619 |
| 2011/0026141 A1* | 2/2011 | Barrows | H04N 5/2254 359/737 |
| 2013/0207851 A1* | 8/2013 | Dabov | H01Q 7/00 343/702 |
| 2014/0004913 A1* | 1/2014 | Kimura | H04M 1/035 455/575.1 |
| 2014/0093095 A1 | 4/2014 | Slotte et al. | |
| 2014/0152890 A1* | 6/2014 | Rayner | G06F 1/1626 348/376 |
| 2015/0031160 A1* | 1/2015 | Wang | H04R 31/00 438/53 |
| 2015/0358704 A1* | 12/2015 | Slotte | H04R 1/02 381/332 |
| 2016/0097838 A1* | 4/2016 | Kim | G01S 3/80 367/7 |
| 2016/0139702 A1* | 5/2016 | Franklin | G06F 3/044 345/174 |
| 2016/0192062 A1* | 6/2016 | DeLay | H04R 1/20 181/184 |
| 2017/0126868 A1* | 5/2017 | Evans | G01J 1/4204 |
| 2017/0153206 A1* | 6/2017 | Sim | G01N 29/2418 |
| 2017/0313288 A1* | 11/2017 | Tippy | B60R 11/04 |
| 2017/0366908 A1* | 12/2017 | Long | H04R 29/002 |
| 2018/0064221 A1* | 3/2018 | Armstrong | A45C 13/008 |
| 2018/0077322 A1* | 3/2018 | Melakari | H04N 5/2253 |
| 2018/0088443 A1* | 3/2018 | Riddiford | G03B 11/041 |
| 2018/0164613 A1* | 6/2018 | Ye | G03B 17/02 |
| 2018/0224735 A1* | 8/2018 | Ilhan | G03B 17/48 |
| 2018/0284947 A1* | 10/2018 | Khajeh | G06F 3/0436 |
| 2018/0300528 A1* | 10/2018 | Fourre | G06K 9/0012 |
| 2018/0358399 A1* | 12/2018 | Huang | H01L 272/14652 |
| 2019/0261108 A1* | 1/2019 | Saksela | G01H 3/125 |

OTHER PUBLICATIONS

Boominathan, V. et al., Lensless Imaging: A computational renaissance. In: IEEE Signal Processing Magazine IEEE, vol. 33, No. 5, dated Sep. 2016, ISSN 1053-5888.

International Search Report and Written Opinion For International Application No. PCT/FI2017/050944 dated Mar. 20, 2018, 13 pages.

Asif, S. et al., *FlatCam: Thin, Bare-Sensor Cameras Using Coded Aperture and Computation*, arXiv 1509.00116v2, Cornell University (Jan. 27, 2016) 12 pages.

Enzenhofer, A., *Combined Opto-Acoustical Sensor Modules for Km3NeT*, arXiv:1408.4349v1, Cornell University (Aug. 19, 2014) 8 pages.

* cited by examiner

AUDIO AND VISUAL SYSTEM INCLUDING A MASK FUNCTIONING FOR A CAMERA MODULE AND AN AUDIO TRANSDUCER MODULE

TECHNOLOGICAL FIELD

An audio and visual system is provided in accordance with an example embodiment and, more particularly, an audio and visual system is provided that includes a mask overlying a camera sensor and functioning for both a camera module and an audio transducer module.

BACKGROUND

An increasing number of electronic devices include cameras and, in some instances, audio transducers, such as microphones and/or speakers. For example, an increasing number of wearable devices, such as watches, pendants or the like, include cameras and audio transducers. For those wearable devices that include cameras and audio transducers, the wearable devices must be sized and configured to support both the camera and an audio transducer. In this regard, wearable device must generally define openings utilized by the camera and the audio transducer in order to receive optical signals and to radiate and/or receive acoustic signals. As a result of the manner in which wearable devices are worn, the openings cannot generally be formed in the rear face of the device housing that faces the user, but must, instead, be formed in the front or side faces of the device housing. Of these prospective locations, openings defined by the side surface of a wearable device that support the operation of a camera and an optical transducer may be repeatedly blocked, such as by the user or the user's clothing, and, even if not blocked, may be subjected to a noisy environment, such as due to the rustling of clothing near the side surface of a wearable device that impedes the capture of audio signals by an audio transducer. Instances in which the opening associated with the audio transducer is blocked may be particularly destructive in relation to the capture of audio signals by the wearable device since the user of the wearable device generally does not receive any feedback regarding the blockage of the opening associated with the audio transducer and the corresponding decrease in the quality of the audio signals that are captured by the audio transducer until after the fact when the user reviews a previously recorded audio and/or video file.

Thus, the openings associated with a camera and an audio transducer are generally defined by the front face of a wearable device that faces away from the user even though the resulting openings are more noticeable to the user and may correspondingly diminish the aesthetic appeal of the wearable device. By including both a camera and an audio transducer, however, the wearable device may require more openings for communication therewith and, as a result, may be required to dedicate more space, such as more surface area on the front face of the wearable device, to the openings associated with the camera and the audio transducer. In this regard, the wearable device may need to define separate openings for the camera and for the audio transducer. In addition, the wearable device may need to define a cavity, such as within the housing, in acoustic communication with the audio transducer in order to facilitate proper operation of the audio transducer. However, the inclusion of multiple openings in the front face of a wearable device and an internal cavity in association with the audio transducer may increase the overall size of the wearable device, thereby conflicting with the general desire to reduce the size of wearable devices. Additionally, the inclusion of multiple openings in the front face of a wearable device may diminish the aesthetic appearance of the wearable device since many consumers believe that such openings diminish the attractiveness of the resulting device.

Further, the manufacture of the wearable device may be complicated by the need for multiple openings in the front face of the wearable device. In this regard, the opening associated with the camera must generally be aligned with the camera, while the opening associated with the audio transducer must generally be aligned with the audio transducer. Thus, the multiple openings must be separately aligned with different components which, in turn, makes the manufacture of the wearable device more challenging.

BRIEF SUMMARY

An audio and visual system and a wearable device that incorporates an audio and visual system are provided in accordance with an example embodiment in order to reduce the openings acquired for communication with a camera sensor and an audio transducer. As such, the audio and visual system and the wearable device facilitate the capture of optical signals and the radiation or reception of audio signals in an efficient manner while improving the aesthetic appearance of the device, such as a wearable device. Not only is the aesthetic appearance improved as a result of the reduction in the number of openings required for communication with the camera sensor and the audio transducer, but the overall size of the device, such as a wearable device or a device configured for Internet of Things (IoT) applications, may be reduced and the manufacture of the device may be streamlined by reducing the number of openings that must be aligned with a camera sensor and/or an audio transducer.

In an example embodiment, an audio and visual system is provided that includes a camera sensor and a mask overlying the camera sensor and spaced therefrom so as to at least in part define a first cavity between the camera sensor and the mask. The mask comprises a plurality of areas including a plurality of opaque areas and a plurality of areas that are acoustically transparent. The audio and visual system also includes an audio transducer in acoustic communication with the first cavity and configured to radiate or receive audio signals via the mask.

In an example embodiment, the areas that are acoustically transparent define openings through the mask such that the audio transducer is configured to transmit or receive audio signals via the openings defined through the mask. The audio transducer of an example embodiment is configured to generate or receive acoustic signals via at least one of the plurality of acoustically transparent areas through which the acoustic signals propagate and/or the plurality of opaque areas at which the mask vibrates in response to the acoustic signals. The audio and visual system of an example embodiment also includes a printed circuit board with the camera sensor and the audio transducer being carried by the printed circuit board. In an example embodiment, the audio transducer is disposed within a peripheral cavity offset from the mask but in acoustic communication with the first cavity. In another example embodiment, the audio transducer is disposed within the first cavity such that the mask also overlies the audio transducer. The audio transducer of an example embodiment is positioned opposite the mask relative to the camera sensor such that the camera sensor overlies the audio transducer. The camera sensor of this example embodiment defines an opening therethrough such that the audio transducer is in acoustic communication with the first cavity. In another example embodiment, the audio transducer is attached to the mask.

In another example embodiment, an audio and visual system is provided that comprises a camera sensor, an audio transducer and a mask overlying the camera sensor and the audio transducer and spaced from the camera sensor so as to at least in part define a first cavity between the camera sensor and the mask. The mask of this example embodiment includes a plurality of areas including a plurality of opaque areas and a plurality of acoustically transparent areas. The audio transducer in acoustic communication with the first cavity and the plurality of acoustically transparent areas defined by the mask so as to radiate or receive audio signals via the plurality of acoustically transparent areas defined by the mask.

The optically transparent areas may be defined by openings through the mask. The plurality of opaque areas may be both visually and acoustically opaque. The audio transducer of an example embodiment is configured to generate or receive acoustic signals via at least one of the plurality of acoustically transparent areas through which the acoustic signals propagate and/or the plurality of opaque areas at which the mask vibrates in response to the acoustic signals. The audio and visual system of an example embodiment further comprises a printed circuit board with the camera sensor and the audio transducer carried by the printed circuit board. In an example embodiment, the audio transducer is disposed with the first cavity such that the mask also overlies the audio transducer. Alternatively, the audio transducer of an example embodiment is positioned opposite the mask relative to the camera sensor such that the camera sensor overlies the audio transducer. In this example embodiment, the camera sensor defines an opening therethrough such that the audio transducer is in acoustic communication with the first cavity. In an example embodiment in which the audio transducer is offset from a center of the mask, the mask defines the acoustically transparent areas in a non-uniform manner with a greater percentage of the acoustically transparent areas defined by a portion of the mask proximate the audio transducer then defined by a portion of the mask remote from the audio transducer. In an example embodiment, the acoustically transparent areas of the mask constitute at least 10% in terms of surface area of the mask that overlies the camera sensor.

In yet another embodiment, a wearable device is provided that includes a housing and an audio and visual system at least partially disposed within the housing. The audio and visual system includes a camera sensor and a mask overlying the camera sensor and spaced therefrom so as to at least in part define a first cavity between the camera sensor and the mask. The mask comprises a plurality of areas including a plurality of opaque areas and a plurality of acoustically transparent areas. The audio and visual system further comprises an audio transducer in acoustic communication with the first cavity and configured to radiate or receive audio signals via the mask.

The audio transducer of an example embodiment is configured to generate or receive acoustic signals via at least one of the plurality of acoustically transparent areas through which the acoustic signals propagate and/or the plurality of opaque areas at which the mask vibrates in response to the acoustic signals. The audio transducer of an example embodiment is disposed within a peripheral cavity offset from the mask but in acoustic communication with the first cavity. In another example embodiment, the audio transducer is disposed within the first cavity such that the mask also overlies the audio tranducer. The audio tranducer of another example embodiment is attached to the mask. In an example embodiment in which the housing defines one or more apertures, the audio tranducer is in acoustic communication both with the first cavity and with the one or more apertures defined by the housing and configured to radiate or receive audio signals therethrough.

BRIEF DESCRIPTION OF DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

An audio and visual system is provided in accordance with an example embodiment that accommodates both a camera sensor and an audio transducer in a manner that reduces the number of openings that are required in order to permit the camera sensor to receive optical signals and the audio transducer to radiate or receive audio signals. In this regard, the audio and visual system may include a first part or layer, such as a mask as referenced hereinafter by way of example, that overlies the camera sensor and that facilitates the reception of optical signals by the camera sensor and the radiation or reception of audio signals by the audio transducer. Consequently, the audio and visual system may be more aesthetically pleasing and/or may have a smaller form factor as a result of the reduction in the number of openings required to support operation of the camera sensor and the audio transducer. Thus, the audio and visual system of an example embodiment may be incorporated into a smaller device, such as a wearable device, e.g., a watch, a pendant, an armband, or the like, in order to provide the desired audio and visual functionality in an aesthetically pleasing and relatively small package. Alternatively, the audio and visual system of an example embodiment may be incorporated into other types of devices, such as devices configured for IoT applications. Additionally, the audio and visual system may be easier to manufacture by reducing the number of separate alignments that must be performed between openings and a camera sensor and/or an audio transducer.

Figure 1:
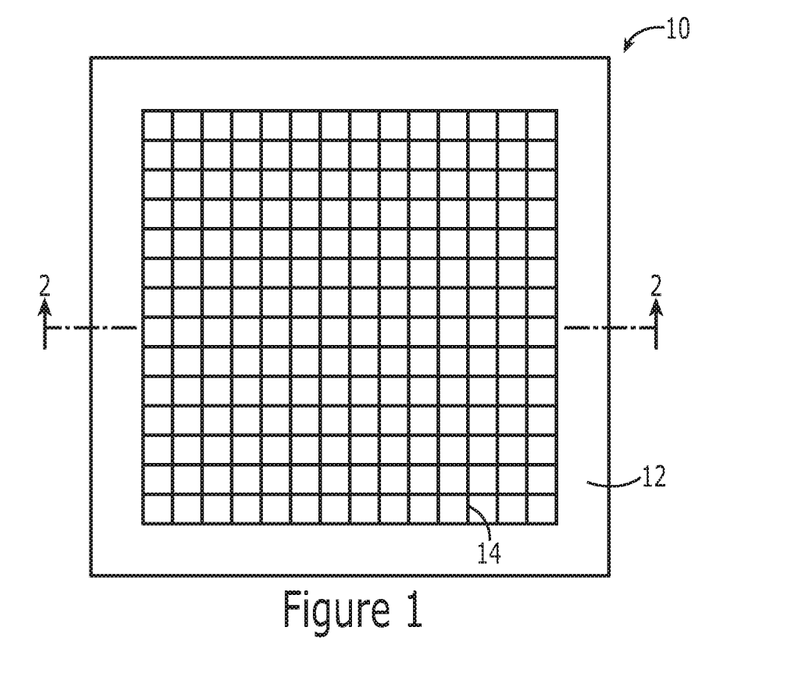
FIG. 1 is a top view of an audio and visual system of an example embodiment which depicts a mask overlying a camera sensor.

Referring now to FIG. 1, the top view an audio and visual system 10 of an example embodiment is depicted. In instances in which the audio and visual system is incorporated within a wearable device, the surface of the audio and visual system depicted in FIG. 1 may be the front face of the wearable device that faces away from the user. As shown in FIG. 1, the audio and visual system includes a housing 12 defining a first cavity, such as an air cavity, opening through a surface of the housing and a mask 14 supported by the housing so as to cover the first cavity. In this regard, FIG. 2 depicts a side view of the audio and visual system of FIG. 1 and further illustrates the first cavity 16 defined by the housing and the manner in which the mask overlies the first cavity and fills the opening through which the first cavity opens through a surface of the housing.

Figure 2:
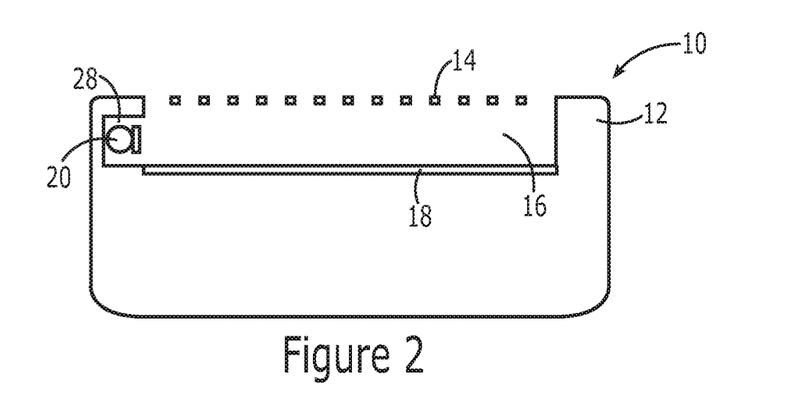
FIG. 2 is a side view of the audio and visual system of FIG. 1 taken along line 2-2 illustrating the mask overlying the camera sensor and an audio transducer configured to radiate or receive audio signals via the mask in accordance with an example embodiment.

As also shown in FIG. 2, the audio and visual system 10 includes a camera sensor 18 and an audio transducer 20. The audio transducer may be a microphone for receiving audio signals and/or a speaker for generating audio signals that radiate from the audio and visual system. The camera sensor, such as a silicon-based camera sensor, is disposed within the first cavity 16 defined by the housing 12 and, in an example embodiment, may be coextensive with the mask 14 so as to be aligned and be of the same size and shape as the mask. However, the camera sensor of other example embodiments may be smaller than the mask such that the camera sensor underlies some, but not all, portions of the mask. In an example embodiment, the mask and the camera sensor may be a FlatCam™ camera with the mask effectively replacing the camera optics. In an embodiment in which the mask and the camera sensor are comprised by a FlatCam™ camera, the audio transducer may be located close to the camera sensor as a FlatCam™ camera does not include auto-focus features that otherwise create noise that would detract from the audio signals that are captured by the audio transducer. Further, while the audio and visual system depicted in FIG. 2 includes a single camera sensor, the audio and visual system may include a plurality of camera sensors in another example embodiment. Also, while referenced here as a camera sensor, the camera sensor of an embodiment may be a camera such that reference herein to a camera sensor includes one or more camera sensors, one or more cameras or the like. Regardless of the manner in which the camera sensor is instantiated, the camera sensor is configured to receive optical signal incident thereupon so as to capture one or more images, such as one or more still images, one or more sequential images that comprise a video or the like.

Figure 3:
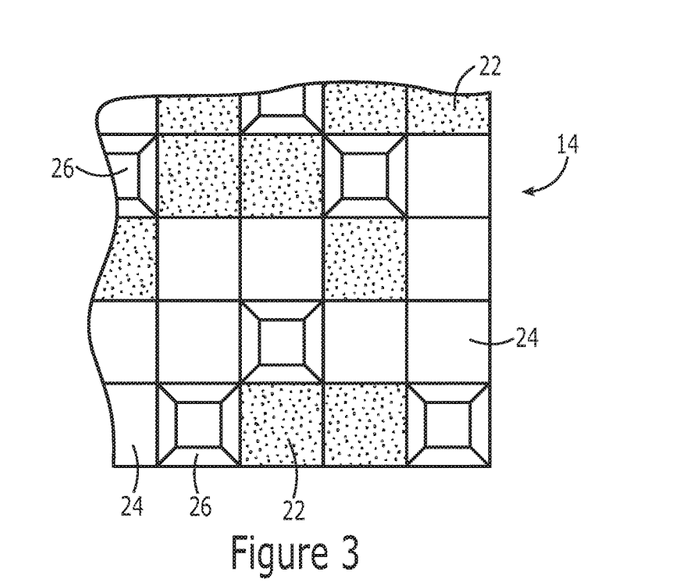
FIG. 3 is a fragmentary view of a mask that includes opaque areas, areas that are transparent and areas that define openings through the mask in accordance with an example embodiment.

The mask 14 overlies the camera sensor 18 and is spaced therefrom so as to define the first cavity 16 between the camera sensor and the mask as shown in FIG. 2. The mask is comprised of a plurality of areas that may be differently constructed in order to differently impact the propagation of optical and audio signals. As shown by the shaded cells in FIG. 3, for example, the mask may include a plurality of opaque areas 22. The opaque areas may be visually opaque so as to inhibit or prevent the propagation of optical signals. Additionally or alternatively, the opaque areas may be acoustically opaque so as to largely or completely inhibit or prevent the propagation of audio signals therethrough. The opaque areas may be formed in various manners, but are formed of quartz with a chrome mask in one embodiment that is both acoustically and visually opaque or formed of quartz without a chrome mask in another embodiment that is acoustically opaque but visually transparent with little, if any, diminution of the optical signals as shown by the faceted cells 26 of FIG. 3. The mask may also include a plurality of acoustically transparent areas 24. The acoustically transparent areas are configured to permit audio signals to propagate therethrough with little, if any, attenuation of the audio signals. In some embodiment, the acoustically transparent areas may also allow optical signals to propagate therethrough with little, if any, diminution so as to also be visually transparent. The acoustically transparent areas may be formed in various manners including of acoustically transparent materials, such as a transparent plastic film in embodiments in which the acoustically transparent areas are also visually transparent or a foam, such as formed by a porous metal, a porous plastic, a foam plastic, etc., in other embodiments in which the acoustically transparent areas are visually opaque. However, a mask of one example embodiment forms the acoustically transparent areas by defining openings through the mask in those areas that are to be acoustically transparent so as also to be visually transparent by facilitating the propagation of both acoustic and optical signals therethrough.

In relation to the generation or reception of acoustic signals via the mask, the areas of the mask that are acoustically transparent permit acoustic signals to propagate therethrough. At least some of the visually opaque areas of the mask may also serve to generate or receive acoustic signals. For example the acoustic energy of the acoustic signals may cause the opaque areas of the mask to vibrate such that mask may function as a diaphragm or membrane in order to also generate or receive acoustic signals.

Thus, the mask 14 of an example embodiment is configured to selectively permit optical and acoustic signals to propagate therethrough. By selectively permitting both acoustic and optical signals to propagate through the mask, both the camera sensor 18 and the audio transducer 20 may utilize the same set of openings, that is, the optically transparent and the acoustically transparent areas, thereby reducing the number of other openings or eliminating any other openings that may otherwise have been required in order to facilitate operation of the camera sensor and the audio transducer. Additionally, the propagation of both optical and audio signals through the mask permits the first cavity 16 to be utilized by both the camera sensor and the audio transducer in order to eliminate, in some, but not all, embodiments, the need for an additional cavity associated with the audio transducer to facilitate operation thereof. As such, the audio and visual system may provide both audio and visual functionality with a smaller and more aesthetically pleasing form factor. The audio and visual system 10 of an example embodiment also closely integrates the camera sensor and the audio transducer, which not only reduces the form factor but facilitates the correlation between and the quality of the audio signals and the optical signals.

Further, the audio and visual system 10 of an example embodiment may provide feedback, such as in a real-time manner, that alerts the user of instances in which the audio transducer 20 is blocked such that the user can remove the blockage and improve the performance of the audio transducer. In this regard, the feedback may be provided by the image captured by the camera sensor 18. In instances in which the image illustrates blockage of at least a portion of the mask 14, the user may determine that the audio transducer is comprised by blockage since the mask defines the areas that permits both optical and audio signals to propagate therethrough.

The mask 14 may define the different areas in various proportions and may distribute the different areas across the mask in various manners. For example, the mask may include equal numbers of opaque areas 22, acoustically transparent areas 24 and visually transparent areas 26 with the areas that are opaque, acoustically transparent and visually transparent being evenly distributed across the surface of the mask. Alternatively, the mask may define different proportions of opaque areas, acoustically transparent areas and visually transparent areas. Additionally, the mask may distribute the opaque areas, the acoustically transparent areas and the visually transparent areas in uneven manners, such as by locating a disproportionately large percentage of the acoustically transparent areas proximate to the audio transducer 20 as described hereinafter.

Figure 4:
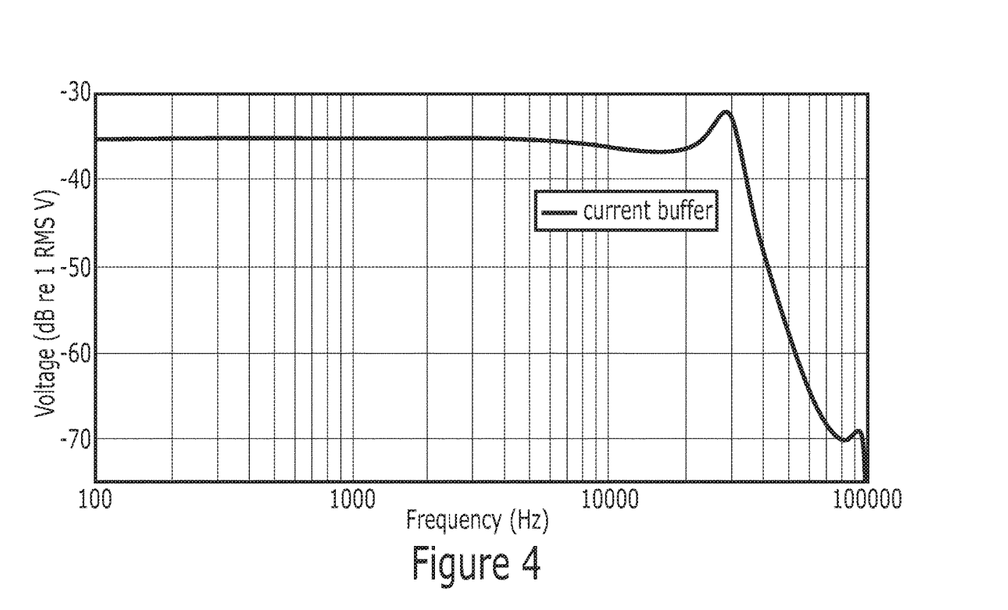
FIG. 4 is a graphical representation of the frequency response of a microphone of an audio and visual system of an example embodiment.

The proportion of the different areas and the distribution of the different areas across the mask 14 may impact the performance of the camera sensor 18 and/or the audio transducer 20. In this regard, FIG. 4 depicts the frequency response of a microphone that receives optical signals that propagate through the acoustically transparent areas 24 of a mask that defines a square array of areas sized to be 512 areas×512 areas. In this example embodiment, the mask defines an equal number of opaque areas 22 and areas 24, 26 that are either optically or acoustically transparent with the opaque areas and the areas that are either optically or acoustically transparent being evenly distributed across the surface of the mask. Of the areas that are either optically or acoustically transparent, the mask of this example embodiment defines 25% of the areas that are either optically or acoustically transparent to be acoustically transparent, such as in the form of an opening defined through the mask, and 75% of the areas that are either optically or acoustically transparent to be optically transparent.

The areas, be it the opaque areas 22, the acoustically transparent areas 24, or the visually transparent areas 26, may have different sizes and shapes from one another and from one embodiment of a mask 14 to another embodiment of a mask. In an example embodiment, however, each of the different areas have the same shape and the same size. For example, the areas may each have a square shape. In alternative embodiments, the areas may have any other shape, such as polygonally shaped areas. Likewise, the mask may include different numbers of areas and the areas may be arranged in various manners, such as a rectangular array of areas or an array of areas having a different shape.

As shown in FIG. 2, the housing 12 of an example embodiment also defines a peripheral cavity 38 that is offset from the mask 14 such that the mask does not overlie the peripheral cavity. However, the peripheral cavity is in acoustic communication with the first cavity 16, such as by being contiguous with the first cavity. As shown in FIG. 2, the audio transducer 20 of an example embodiment is disposed within the peripheral cavity. Thus, the audio transducer can radiate or receive audio signals through the first cavity and via the mask, such as via the acoustically transparent areas 24 of the mask, since the audio transducer is in acoustic communication with the first cavity and the plurality of acoustically transparent areas of the mask. By being disposed in the peripheral cavity, the audio transducer of this example embodiment does not overlie the camera sensor 18 and, as such, does not block or shadow the optical signals received by the camera sensor through the mask that overlies the camera sensor. Although a single housing is depicted in the example embodiment in FIG. 2 to define both the first cavity in which the camera sensor is disposed and the peripheral cavity in which the audio transducer is disposed, the first cavity and the peripheral cavity may be defined by different housing modules that are positioned relative and, in some embodiments, joined to one another to form the resulting housing in which the first cavity and the peripheral cavity are in acoustic communication with one another.

Figure 5:
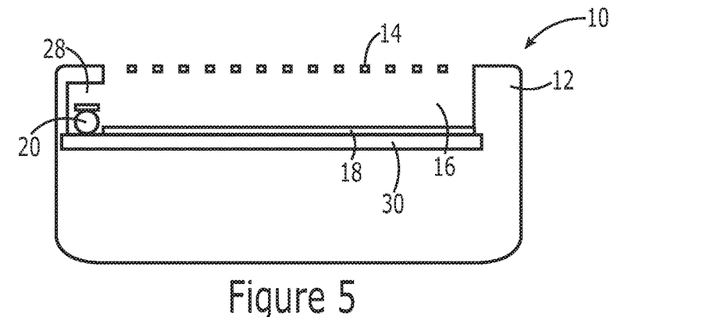
FIG. 5 is a side view of an audio and visual system of an example embodiment in which both the camera sensor and the audio transducer are carried by a printed circuit board.

As shown in FIG. 5, the audio and visual system 10 of an example embodiment includes a printed circuit board 30 and both the audio transducer 20 and the camera sensor 18 may be carried by, such as by being mounted upon, the printed circuit board. Although not shown in FIG. 5, the printed circuit board may be electrically connected and/or communicably connected with other circuitry and components of the audio and visual system or the device, such as a wearable device or a device configured for IoT applications, that embodies the audio and visual system in order to facilitate communication with the camera sensor and the audio transducer. For example, the printed circuit board may facilitate transmission of the images captured by the camera sensor to a display, a storage device or the like. Additionally, the printed circuit board may facilitate the propagation of the audio signals captured by a microphone to a speaker, to a storage device or the like and/or may facilitate the provision of audio signals to the audio transducer in the form of a speaker for output via the acoustically transparent areas 24 of the mask 14.

Figure 6:
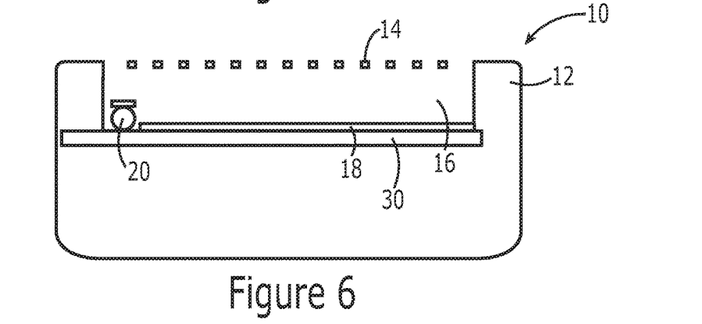
FIG. 6 is a side view of an example embodiment of an audio and visual system of an example embodiment in which both the camera sensor and audio transducer are carried by a printed circuit board and the mask overlies both the camera sensor and the audio transducer.

In other embodiments, the audio transducer 20 is disposed, not within a peripheral cavity 28 as shown in FIGS. 2 and 5, but in the first cavity 16 such that the mask 14 overlies not only the camera sensor 18, but also the audio transducer. As shown in FIG. 6, for example, both the audio transducer and the camera sensor may be carried by, such as mounted upon, a printed circuit board 30. As shown in this example embodiment, the audio transducer and the camera sensor may be mounted upon different portions of the printed circuit board so as to be positionally offset from one another. However, the mask overlies both the camera sensor and the audio transducer. As also shown in FIG. 6, the camera sensor of this example embodiment does not extend across the full width of either the first cavity or the mask, but instead, it extends across only a portion of the first cavity and underlies only a portion of the mask.

Figure 7:
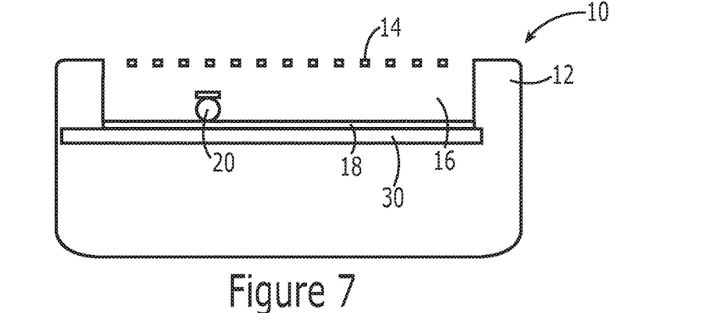
FIG. 7 is a side view of an audio and visual system of an example embodiment in which the audio transducer is disposed upon and overlies a portion of a camera sensor.

In another embodiment in which the audio transducer 20 is disposed within the first cavity 16, the camera sensor 18 is mounted upon the printed circuit board 30 and the audio transducer is, in turn, mounted upon or otherwise carried by the camera sensor so as to overlie a portion of the camera sensor as shown in FIG. 7. The mask 14 again overlies both the camera sensor and the audio transducer in this example embodiment. Unlike the embodiment of FIG. 6 in which the mask extended beyond the camera sensor so as to also overlie the audio transducer, the camera sensor and the mask of the embodiment of FIG. 7 are coextensive such that the camera sensor underlies the entire width of the mask and extends across the entirety of the first cavity. However, a portion of the camera sensor is blocked or shadowed by the audio transducer. Typically, the portion of the camera sensor that is blocked or shadowed by the audio transducer is relatively small with respect to the entire surface area of the camera sensor such that any reduction in resolution or increase in noise in the image captured by the camera sensor is correspondingly limited.

Figure 8:
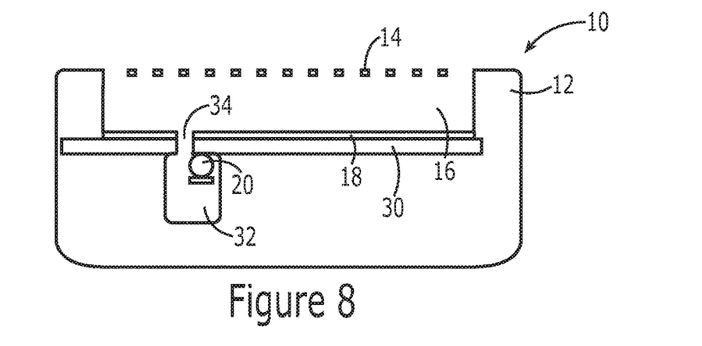
FIG. 8 is a side view of an audio and visual system of an example embodiment in which the audio transducer is positioned opposite the mask relative to the camera sensor such that the camera sensor overlies the audio transducer.

In another example embodiment depicted in FIG. 8, the audio transducer 20 is positioned opposite the mask 14 relative to the camera sensor 20. As such, the housing 12 of this embodiment defines a second cavity 32 rearward of the first cavity (relative to the mask) with the camera sensor 18 overlying the second cavity as shown in FIG. 8. In embodiments that also include a printed circuit board 30, the printed circuit board, as well as the camera sensor mounted thereupon, overlie the second cavity. The audio transducer is disposed within the second cavity. For example, the camera sensor and the audio transducer may be mounted to opposite sides of the printed circuit board. Alternatively, the audio transducer may be electrically connected via flex circuitry. The second cavity is in acoustic communication with the first cavity, such as a result of one or more openings 34 defined through the camera sensor and, in embodiments that include a printed circuit board, also through the printed circuit board. The openings may be formed in various manners, such as by back thinning the wafer that comprises the camera sensor and then etching the wafer from the back with lithography. Alternatively, the wafer that comprises the camera sensor may be deep etched, using lithography, and then back thinned. The acoustic sensor of this example embodiment is configured to radiate and/or receive acoustic signals via the acoustically transparent areas 24 of the mask without blocking or shadowing the camera sensor.

Figure 9:
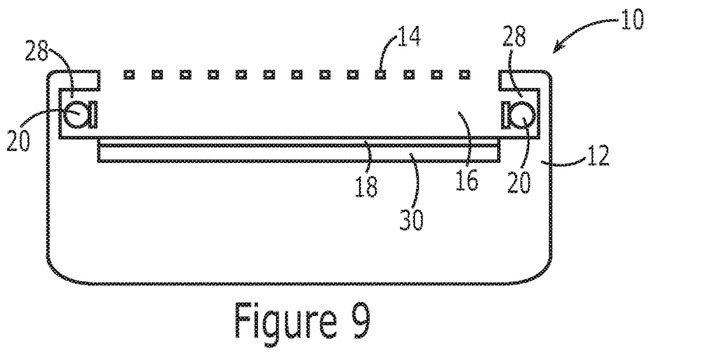
FIG. 9 is a side view of an audio and visual system of an example embodiment which includes two or more audio transducers differently positioned relative to the camera sensor.

Although the embodiments described heretofore have included a single audio transducer 20, the audio and visual system 10 of other embodiments includes a plurality of audio transducers. As shown in FIG. 9, the audio and visual system of an example embodiment includes first and second audio transducers disposed within first and second peripheral cavities 28, respectively, offset from the mask 14 but in acoustic communication within the first cavity 16. In the example embodiment of FIG. 9, the first and second audio transducers are disposed on opposite sides of the first cavity, but the audio transducers may be disposed in different positional relationships relative to one another and the audio and visual system may include different numbers of audio transducers in other embodiments. By including multiple audio transducers, the audio and visual system of an example embodiment may be configured for additional functionality, such as for beamforming as a result of the reception of audio signals from different directions at different times by each of the audio transducers. The first and second audio transducers may be separated by various distances, such as by a distance of between 0.5 cm and 20 cm and, more particularly, by a distance between 1 cm and 4 cm so as to support beamforming functionality.

As noted above, the number and distribution of the different areas of the mask 14 may vary from one embodiment to another. In some embodiments, a greater percentage of the acoustically transparent areas 24, such as the openings, are located proximate to the audio transducer 20, as opposed to other portions of the mask that are more remote from the audio transducer. In the embodiments depicted in FIGS. 2 and 5, for example, the portion of the mask near the peripheral cavity 28 in which the audio transducer is disposed may include a greater percentage of the acoustically transparent areas than other portions of the mask. In an embodiment as shown in FIG. 9 in which the audio and visual system 10 includes a plurality of audio transducers, a greater percentage of the acoustically transparent areas may be defined by those portions of the mask proximate each of the audio transducers than by other portions of the mask more remote from the audio transducers, such as the central portion of the mask.

Figure 10:
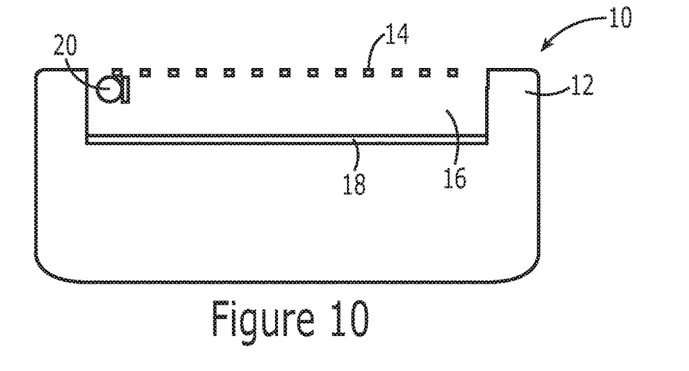
FIG. 10 is a side view of an audio and visual system of an example embodiment in which the audio transducer is attached to the mask.

As shown in FIG. 10, the audio and visual system 10 of another example embodiment includes an audio transducer 20 that is mounted to, such as by being attached to, the mask 14. In this example embodiment, the audio transducer, such as a contact microphone or a piezo microphone, may be attached to a portion of the mask that includes only opaque areas 22 so as not to block or shadow the underlying camera sensor 18. Alternatively, the mask may be sized so as to extend laterally beyond the camera sensor with the audio transducer attached to that portion of the mask that extends beyond the camera sensor so as not to block or otherwise shadow the camera sensor. Although the audio transducer may be mounted to the outwardly facing surface of the mask, the audio transducer of the embodiment depicted in FIG. 10 is mounted to the inwardly facing surface of the mask, that is, the surface that faces into the first cavity 16. In this embodiment, audio signals incident upon the mask may cause the mask to vibrate with the audio transducer, such as in the form of a microphone, being responsive to the vibration of the mask in order to generate audio signals based thereupon. The audio signals that are generated based upon the vibration of the mask may be reflective of the lower frequencies of the audio signals incident upon the mask. In order to capture the higher frequencies of the audio signals incident upon the mask, the mask may include acoustically transparent areas 24, such as openings through the mask, that permit the audio signals incident upon the mask to pass therethrough for reception by the microphone. In some embodiments, the audio signals captured by the microphone may be post-processed in order flatten the frequency response of the microphone that may have been impacted by the mask, such as by correcting for the attenuation of higher frequency audio signals by the mask, particularly in instances in which the mask does not include acoustically transparent areas.

Figure 11:
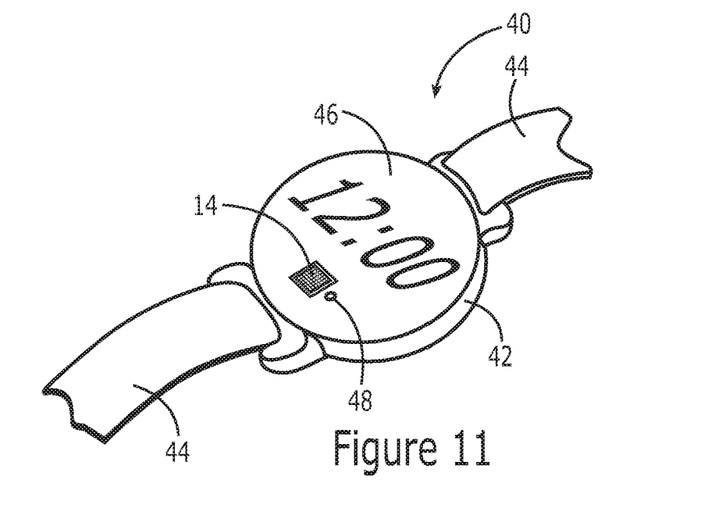
FIG. 11 is a perspective view of a wearable device including an audio and visual system of an example embodiment of the present disclosure.

As noted above, the audio and visual system 10 may be embodied in a variety of different devices including wearable devices or a device configured for IoT applications. In relation to a wearable device, a variety of different types of wearable devices may include an audio and visual system in accordance with an embodiment of the present application. For example, a wearable device that includes an audio and visual system of an example embodiment may include a watch, a pendant, an arm band, or the like. By way of example, but not of limitation, a wearable device 40 in the form of a watch that includes an audio and visual system is depicted in FIG. 11. As shown, the watch includes a housing 42 and a band 44 attached to opposite sides of the housing for permitting the watch to be releasably secured upon the wrist of a user.

The housing 42 defines a functional area 46 that may include a watch, a display or the like. In accordance with an example embodiment, the wearable device 40, such as the watch, also includes an audio and visual system 10 as described herein. As shown in FIG. 11, the mask 14 of the audio and visual system is visible via the front face of the watch in order to receive optical signals for capture by the camera sensor 18 and to radiate or receive acoustic signals. In some embodiments, the various areas defined by the mask support the functionality of both the camera sensor and the audio transducer 20 including the propagation of both audio and acoustic signals therethrough. In some embodiments in which the acoustic transducer is disposed within a peripheral cavity 28 as described above, the housing 42 of the wearable device, such as the front face of the watch, may also define one or more additional openings 48 that open directly into the peripheral cavity. However, these additional opening(s) are generally optional and, in any event, the number and size of openings required to support the operation of the camera sensor and the audio transducer is limited so as to improve the aesthetic appearance, reduce issues associated with alignment of the openings with the camera sensor and the audio transducer, and permit the size of the wearable device to be correspondingly reduced.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. An audio and visual system comprising:
   a camera sensor;
   a mask overlying the camera sensor and spaced therefrom so as to at least in part define a first cavity between the camera sensor and the mask, wherein the mask comprises a plurality of areas including one or more visually transparent areas, one or more visually opaque areas and one or more areas that are acoustically transparent or that vibrate in response to acoustic signals, and wherein one or more of the visually opaque areas are positioned so as to at least partially overlie the camera sensor; and
   an audio transducer in acoustic communication with the first cavity and configured to generate or receive acoustic signals via at least one of the one or more areas of the mask,
   wherein the camera sensor is configured to receive optical signals and the audio transducer is configured to generate or receive acoustic signals via at least a same one of the one or more areas of the mask.

2. An audio and visual system according to claim 1 wherein the areas that are acoustically transparent define openings through the mask.

3. An audio and visual system according to claim 1 wherein the audio transducer is configured to generate or receive acoustic signals via one or more of the plurality of areas that are acoustically transparent through which the acoustic signals propagate or the plurality of opaque areas at which the mask vibrates in response to the acoustic signals.

4. An audio and visual system according to claim 1 further comprising a printed circuit board, wherein the camera sensor and the audio transducer are carried by the printed circuit board.

5. An audio and visual system according to claim 1 wherein the audio transducer is disposed within one of: a peripheral cavity offset from the mask but in acoustic communication with the first cavity or the first cavity such that the mask overlies the audio transducer.

6. An audio and visual system according to claim 1 wherein the audio transducer is positioned opposite the mask relative to the camera sensor such that the camera sensor overlies the audio transducer, and wherein the camera sensor defines an opening therethrough such that the audio transducer is in acoustic communication with the first cavity.

7. An audio and visual system according to claim 1 wherein the audio transducer is attached to the mask.

8. An audio and visual system according to claim 1 wherein the plurality of visually opaque areas of the mask are configured to vibrate in response to acoustic signals, and wherein the acoustic transducer is configured to receive the acoustic signals via vibration of the mask including the plurality of visually opaque areas.

9. An audio and visual system according to claim 1 wherein the acoustic transducer is configured to generate or receive acoustic signals without any other opening to facilitate operation of the audio transducer other than provided by the mask overlying the camera sensor.

10. An audio and visual system comprising:
    a camera sensor;
    an audio transducer; and
    a mask overlying the camera sensor and the audio transducer and spaced from the camera sensor so as to at least in part define a first cavity between the camera sensor and the mask, wherein the mask comprises a plurality of areas including one or more visually transparent areas, one or more visually opaque areas and one or more areas that are acoustically transparent or that vibrate in response to acoustic signals, and wherein one or more of the visually opaque areas are positioned so as to at least partially overlie the camera sensor, wherein the audio transducer is in acoustic communication with the first cavity and the plurality of areas defined by the mask so as to generate or receive acoustic signals via the plurality of areas defined by the mask, wherein the camera sensor is configured to receive optical signals and the audio transducer is configured to generate or receive acoustic signals via at least a same one of the one or more areas of the mask.

11. An audio and visual system according to claim 10 wherein the acoustically transparent areas define openings through the mask.

12. An audio and visual system according to claim 10 wherein the audio transducer is configured to generate or receive acoustic signals via one or more of the plurality of acoustically transparent areas through which the acoustic signals propagate or the plurality of opaque areas at which the mask vibrates in response to the acoustic signals.

13. An audio and visual system according to claim 10 wherein the plurality of opaque areas are both visually and acoustically opaque.

14. An audio and visual system according to claim 10 further comprising a printed circuit board, wherein the camera sensor and the audio transducer are carried by the printed circuit board.

15. An audio and visual system according to claim 10 wherein the audio transducer is disposed within the first cavity such that the mask overlies the audio transducer.

16. An audio and visual system according to claim 10 wherein the audio transducer is positioned opposite the mask relative to the camera sensor such that the camera sensor overlies the audio transducer, and wherein the camera sensor defines an opening therethrough such that the audio transducer is in acoustic communication with the first cavity.

17. An audio and visual system according to claim 10 wherein the audio transducer is offset from a center of the mask, and wherein the mask defines the acoustically transparent areas in a non-uniform manner with a greater percentage of the acoustically transparent areas defined by a portion of the mask proximate the audio transducer than defined by a portion of the mask remote from the audio transducer.

18. An audio and visual system according to claim 10 wherein the plurality of visually opaque areas of the mask are configured to vibrate in response to acoustic signals, and wherein the acoustic transducer is configured to receive the acoustic signals via vibration of the mask including the plurality of visually opaque areas.

19. An audio and visual system according to claim 10 wherein the acoustic transducer is configured to generate or receive acoustic signals without any other opening to facilitate operation of the audio transducer other than provided by the mask overlying the camera sensor.

20. A wearable device comprising:
a housing; and
an audio and visual system at least partially disposed within the housing, the audio and visual system comprising:
a camera sensor;
a mask overlying the camera sensor and spaced therefrom so as to at least in part define a first cavity between the camera sensor and the mask, wherein the mask comprises a plurality of areas including one or more visually transparent areas, one or more visually opaque areas and one or more areas that are acoustically transparent or that vibrate in response to acoustic signals, and wherein one or more of the visually opaque areas are positioned so as to at least partially overlie the camera sensor; and
an audio transducer in acoustic communication with the first cavity and configured to generate or receive acoustic signals via at least one of the one or more areas of the mask,
wherein the camera sensor is configured to receive optical signals and the audio transducer is configured to generate or receive acoustic signals via at least a same one of the one or more areas of the mask.

21. A wearable device according to claim 20 wherein the audio transducer is configured to generate or receive acoustic signals via one or more of the plurality of acoustically transparent areas through which the acoustic signals propagate or the plurality of opaque areas at which the mask vibrates in response to the acoustic signals.

22. A wearable device according to claim 20 wherein the audio transducer is disposed within one of: a peripheral cavity offset from the mask but in acoustic communication with the first cavity or the first cavity such that the mask overlies the audio transducer.

23. A wearable device according to claim 20 wherein the housing defines one or more apertures, and wherein the audio transducer is in acoustic communication both with the first cavity and with the one or more apertures defined by the housing and configured to radiate or receive audio signals therethrough.

24. A wearable device according to claim 20 wherein the plurality of visually opaque areas of the mask are configured to vibrate in response to acoustic signals, and wherein the acoustic transducer is configured to receive the acoustic signals via vibration of the mask including the plurality of visually opaque areas.

25. A wearable device according to claim 20 wherein the acoustic transducer is configured to generate or receive acoustic signals without any other opening to facilitate operation of the audio transducer other than provided by the mask overlying the camera sensor.

* * * * *